United States Patent
Konigsberg

(10) Patent No.: US 8,635,136 B1
(45) Date of Patent: *Jan. 21, 2014

(54) METHOD, SYSTEM, AND COMPUTER PROGRAM PRODUCT FOR GROUPING SECURITIES IN ORDER TO CALCULATE A FEE

(75) Inventor: Paul C. Konigsberg, Mclean, VA (US)

(73) Assignee: Freddie MAC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/532,184

(22) Filed: Jun. 25, 2012

Related U.S. Application Data

(63) Continuation of application No. 10/975,466, filed on Oct. 29, 2004, now Pat. No. 8,209,256.

(51) Int. Cl.
*G06Q 40/00* (2012.01)

(52) U.S. Cl.
USPC .............................................. 705/35; 705/37

(58) Field of Classification Search
USPC ...................................................... 705/35–45
See application file for complete search history.

(56) References Cited

U.S. PATENT DOCUMENTS

| | | | |
|---|---|---|---|
| 5,563,783 A | * 10/1996 | Stolfo et al. | 705/7.25 |
| 5,615,109 A | * 3/1997 | Eder | 705/7.12 |
| 7,587,351 B1 | 9/2009 | Kain et al. | |

OTHER PUBLICATIONS

Schwarcz, Steven L., "The Parts are Greater than the Whole: How Securization of Divisible Interests Can Revolutionize Structured Finance and Open the Capital Markets to Middle-Market Companies", Columbia Business Law Review, vol. 1993, p. 139. (1993).

* cited by examiner

Primary Examiner — Richard C Weisberger
(74) Attorney, Agent, or Firm — Oblon, Spivak, McClelland, Maier & Neustadt, L.L.P.

(57) ABSTRACT

A method, system, and computer program product for calculating a reduced fee associated with combining previously securitized mortgage-backed securities to form a new and larger security called a Mega. The method includes identifying a group of Megas that correspond to at least one predetermined fee discount parameter. The group of Megas are members of a set of Megas and the set of Megas contain a number of Megas equal to or larger than a number of Megas in the group of Megas. The method includes calculating a fee for said group of Megas and repeating the steps of identifying a group and calculating a fee until a plurality of groups of Megas have been identified and corresponding Mega group fees have been calculated. The method also includes choosing from said plurality of groups of Megas a final set of Mega groups having a reduced total fee.

25 Claims, 4 Drawing Sheets

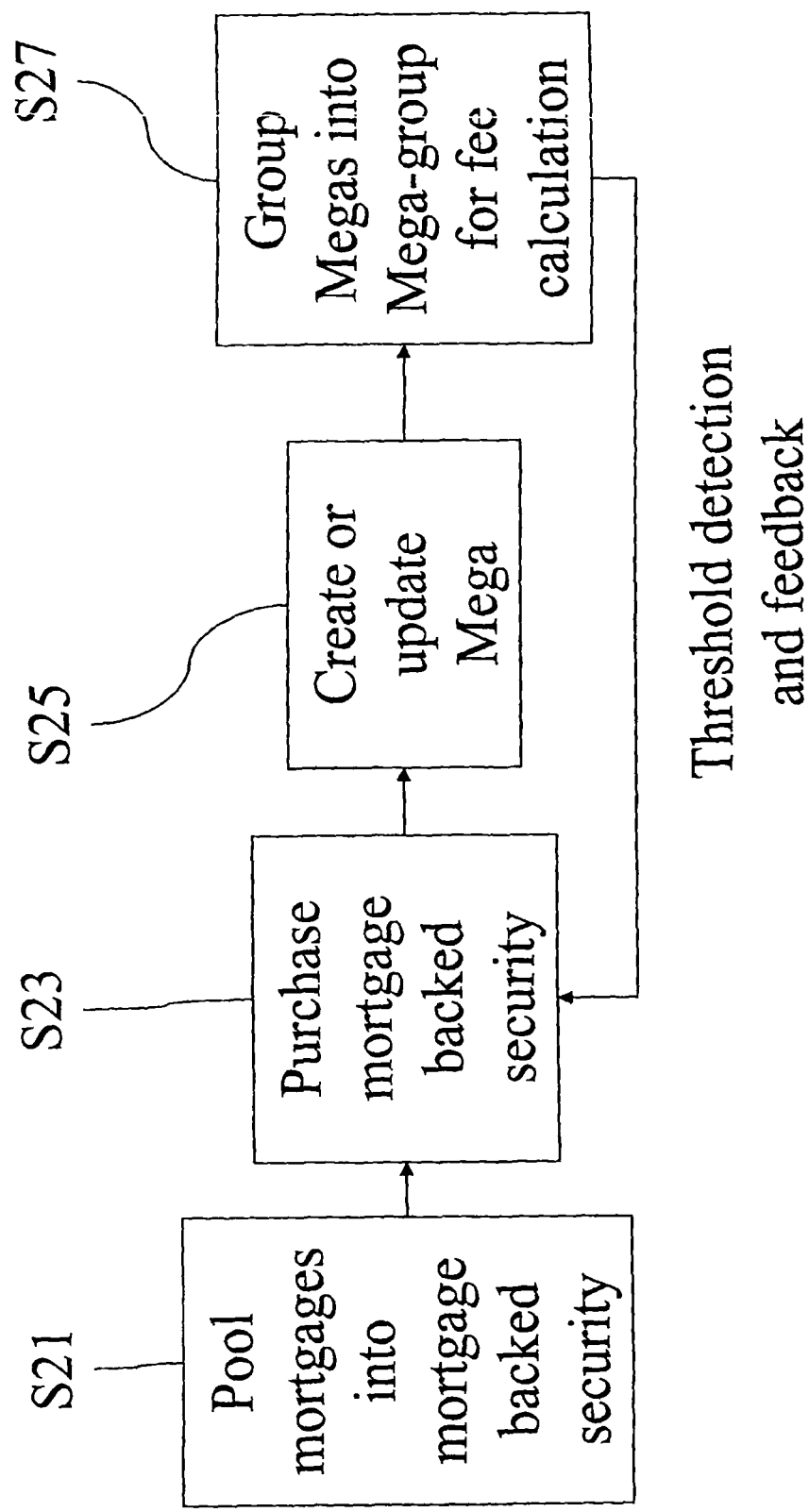

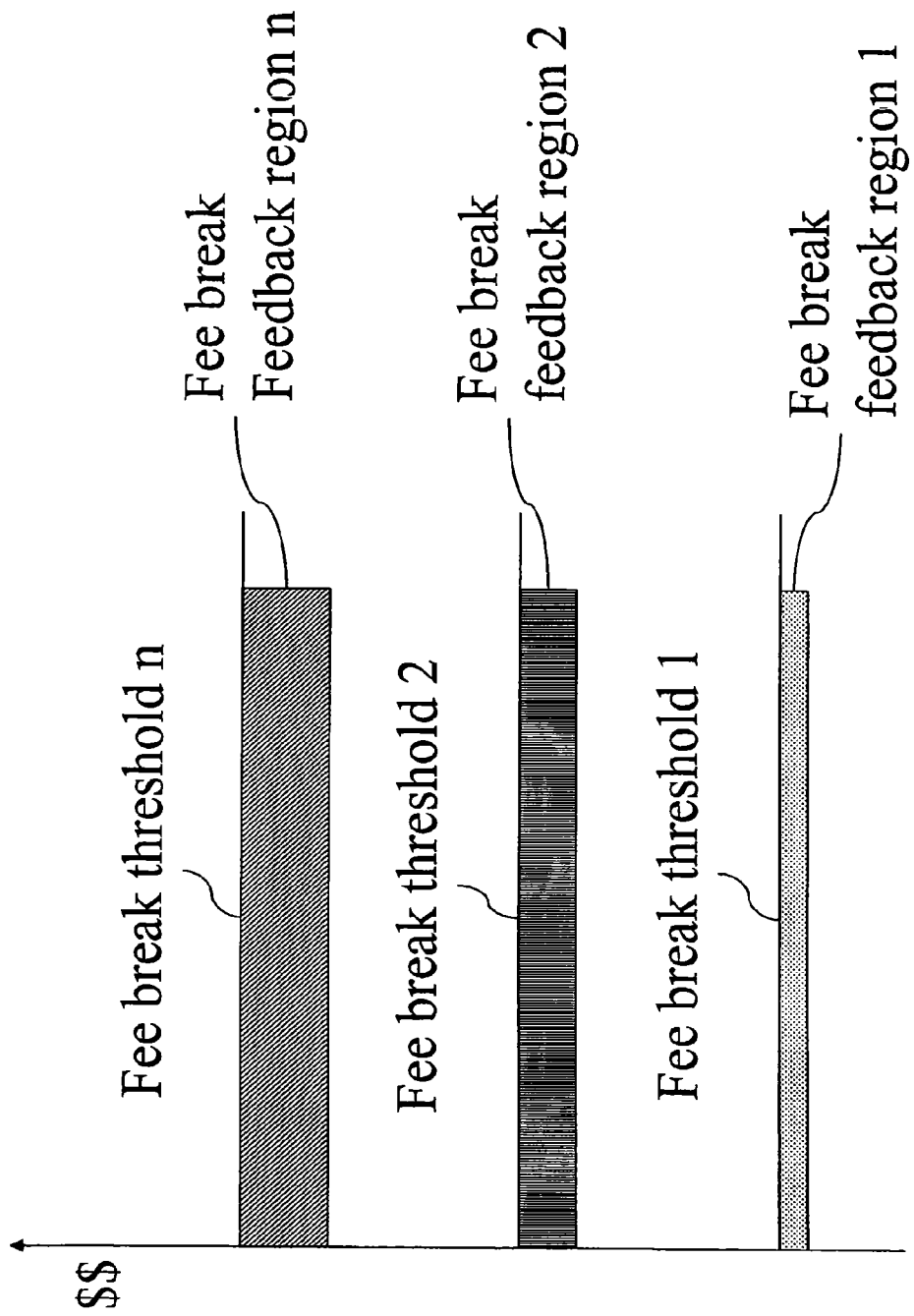

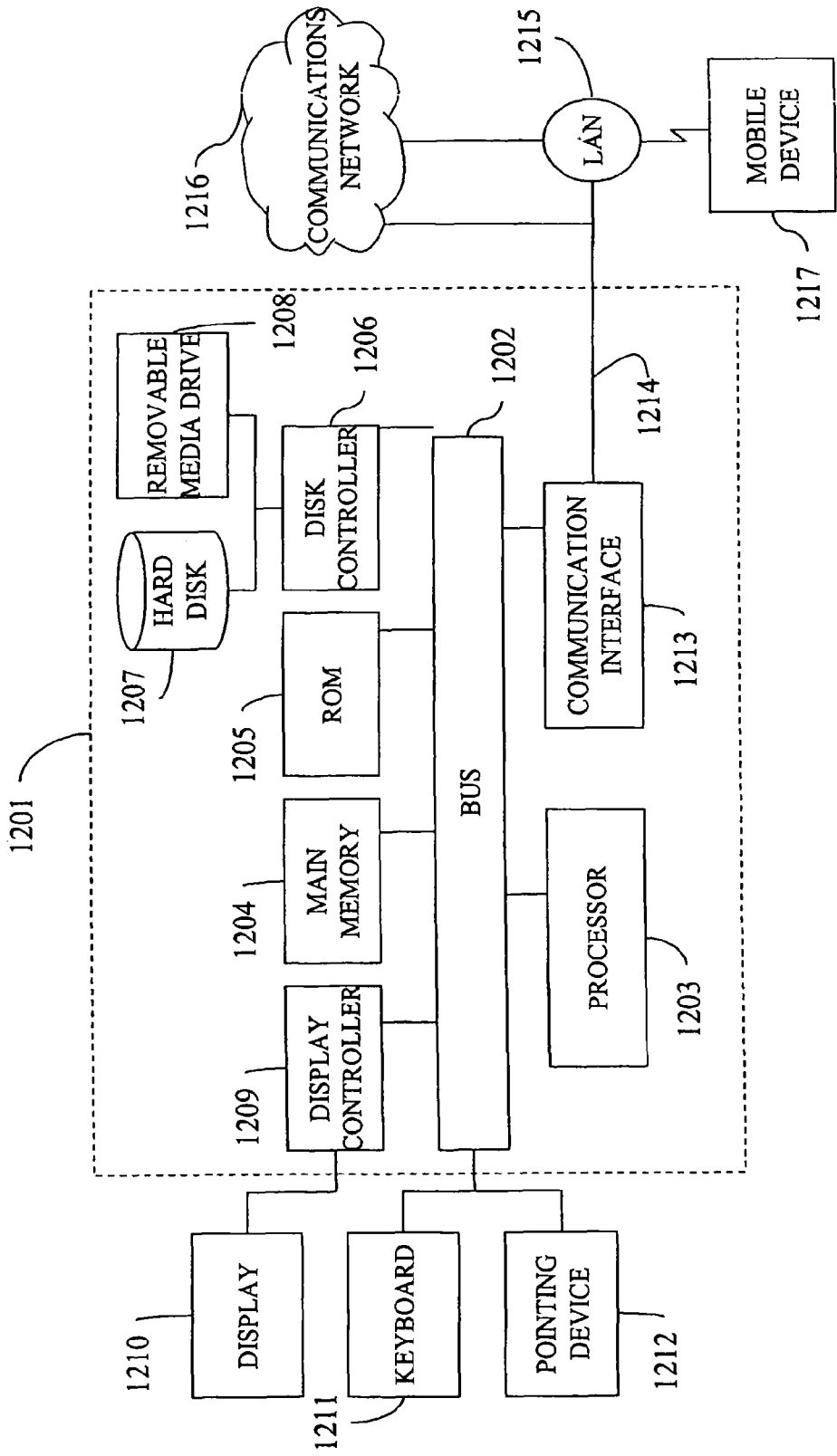

METHOD, SYSTEM, AND COMPUTER PROGRAM PRODUCT FOR GROUPING SECURITIES IN ORDER TO CALCULATE A FEE

The present application is a Continuation application of 10/975,466, filed on Oct. 29, 2004 now U.S. Pat. No. 8,209,256.

BACKGROUND OF THE INVENTION

1. Field of the Invention

The present invention generally relates to financial methods, systems, and computer program products for calculating a reduced fee associated with combining previously securitized mortgage-backed securities to form a new and larger security instrument that is backed by two or more of said previously securitized mortgage-backed securities.

2. Discussion of the Related Art

Many consumers who purchase a home will borrow funds from a lender and grant the lender a security interest in the home, which serves as collateral. The legal document whereby the consumer/borrower uses the property as collateral for repayment of the loan is commonly known as a mortgage. Lenders sell many of the mortgage loans that they originate in exchange for cash or securities into the secondary mortgage market that is dominated by the Federal Home Loan Mortgage Corporation ("Freddie Mac") and the Federal National Mortgage Association ("Fannie Mae"). By selling mortgage loans into the secondary mortgage market, lenders access capital in order to have funds to meet consumer demand for additional home mortgages. The secondary market for mortgage loans keeps the supply of money for housing widely available and ultimately lowers costs to consumers.

Freddie Mac and Fannie Mae will either purchase home mortgages for cash or issue securities in exchange for the mortgages. When securities are exchanged for mortgages, they are known as mortgage-backed securities (MBS). The Freddie Mac brand name for these securities is "participating certificates" and the Fannie Mae brand name for these securities is "pass-through certificates." The generic term, MBS, is used herein to refer generically to these types of securities. MBS are pass-through securities that each represent an undivided beneficial interest in one or more pools of mortgage loans or in other MBS of pooled mortgage loans. In general, a mortgage pool is a positively identified group of mortgages combined for resale to individuals or entities called MBS "holders." A MBS may consist of mortgage loans sourced from one or more lenders and organized into pools based on shared characteristics. For a fee, Freddie Mac and Fannie Mae will also analyze an issuer's inventory of mortgage loans to determine an optimum securities structure.

Although the Tax Reform Act of 1986 ("TRA 1986") eliminated many of the tax advantages of traditional real estate ownership and syndication, it offset this in part by creating an innovative tax structure that changed the way real estate mortgages could be held. The TRA 1986 authorized the creation of the real estate mortgage investment conduit ("REMIC") as a vehicle for creating multi-class, pass-through, MBS that resolved certain tax and balance sheet problems associated with another mortgage security called the "collateralized mortgage obligation" or CMO.

The REMIC is an investment-grade mortgage bond that separates mortgage pools into different maturity and risk classes and serves as a conduit for holding the mortgage pools represented by the MBS. Cash flows derived from payments of principal and interest on the underlying mortgages are passed through the REMIC structure to holders of each REMIC class with no income tax consequences to the REMIC structure itself. The process of forming the mortgage pools and issuing the MBS is called securitization. Most securities trading in the United States receive a CUSIP (Committee on Uniform Securities and Identification Procedures) number, which is a unique nine-character number that identifies the security. A CUSIP number is like a serial number; each individual security traded in the US market has a different CUSIP number that functions to uniquely identify that security.

A REMIC is a multiclass, mortgage-backed security in which cash flows from the underlying collateral (e.g., a pool of pass-through securities) are allocated to individual groups of bonds, called tranches, of varying maturities, coupons, and payment priorities. Each REMIC includes a set of two or more tranches, each having average lives and cash flow patterns designed to meet specific investment objectives. These tranches are distinguished by their sensitivity to the prepayment risk of the underlying mortgage-related collateral. Therefore, they may have different sensitivities to prepayment risk, bear different interest rates, and have different average lives and final maturities.

REMICs offer investment flexibility because each REMIC may be designed according to specific investor needs or general market demand. As such, an underwriter of the REMIC can provide the issuer of a REMIC with a proposed deal structure before the issuance of the REMIC. It is the responsibility of the issuer to take that structure and validate it for accuracy, e.g., that the cash flows are appropriately allocated across tranches and groups and that there is nothing about the structure that the issuer cannot accurately disclose. Additionally, the underwriter validates that the issuer should be able to settle any trades on a timely basis and accurately make monthly payments to investors after any bonds in a REMIC are sold.

Several years after the first REMICs were formed, Freddie Mac and Fannie Mae began to combine previously securitized MBS to form new and larger securities backed by two or more MBS. Freddie Mac refers to this security structure as a Giant MBS, and Fannie Mae refers to these as a Mega MBS. Ginnie Mae refers to these securities as Platinums. For convenience, the term "Mega" is used herein to refer to Platinum, Giant, and Mega MBS. Megas and Giants are pass-through securities formed by combining individual MBS (or portions of MBS) with other MBS (or portions of MBS). Megas and Giants allow investors to manage their portfolios efficiently by consolidating smaller MBS into Megas or Giants. (Investors in Megas and Giants are known as "holders.")

For example, a holder with a portfolio of 100 smaller MBS, each a separate security, has to track and account for 100 different CUSIP numbers. If the holder has the 100 MBS combined into a single Mega or Giant, however, the holder has to track and account for only a single CUSIP number assigned to the Mega or Giant. Holding a Mega or Giant greatly reduces the internal processing and accounting costs for tracking the balance and monitoring the monthly payments associated with underlying mortgage investments compared to the cost of holding several smaller IVIES that each pay on different schedules and may amortize at different speeds. Megas and Giants are large, highly liquid, and transparent, making them more attractive to investors than smaller MBS.

Other benefits of investing in Megas and Giants are: lower borrowing and security administration costs resulting in standardized pricing; increased market liquidity; ease of trade execution; the availability of customized pooling; and the fact that comprehensive disclosure of Megas and Giants are readily available to holders.

Megas and Giants lower internal processing and accounting costs because it is easier to track the balance and monitor the monthly payments for one large pool rather than multiple smaller pools. From the holder's point of view, it is more economical to receive periodic payments by wire from a single Mega or Giant pool than to receive multiple wires relating to the multiple underlying pools. From the administrator's point of view, the economies of scale result in lower administration and transaction costs for larger pools and therefore dealers and financial institutions are able to charge lower rates for administration.

Moreover, by forming Megas and Giants, issuers may combine odd sized MRS into one pool and achieve the more standardized pricing available for large pools, such as those with aggregate loan balances in excess of $5,000,000. Another feature that makes Megas and Giants more attractive to the market than smaller pools are that they are more likely to meet the Bond Market Association's (BMA's) "good delivery" guidelines. The good delivery guidelines require loans in the pool to have a minimum pool balance ($25,000) and a predefined range of maturity dates, depending on the securities. (By way of example, for 30-year Freddie Mac or Fannie Mae securities, the predefined range of maturity dates is between 181-361 months to maturity; for 15-year Freddie Mac or Fannie Mae securities, it must not exceed 181 months, and for Ginnie Mae 30-year securities, there must be 28 years remaining).

Megas and Giants also provide the ability to structure pools of loans having specific characteristics, such as loans with greater geographic diversity, or loans with a geographic concentration, or loans with a short weighted average remaining maturities (WARM). For example, a holder may realize that there is more value in a pool that is structured to reduce the prepayment variation (achieved through greater geographic diversity), or that there is value in a pool with a short WARM. MBS and Megas/Giants (or portions thereof) can be combined, in turn, and the cash flows from these MBS and Megas/Giants can be directed to REMIC class securities in a process called resecuritization.

Until recently, an internal business division of Freddie Mac was the single largest buyer of new-issue Freddie Mac securities from the mortgage banking community. It also ranked among the top national dealers in terms of monthly Mortgage-Backed Securities Clearing Corporation trading volume. Through this business division, known as the Securities Sale and Trading Group ("SS&TG") SS&TG, Freddie Mac provided liquidity for mortgage-backed-securities and maintains a long-term market presence.

SS&TG's primary business was to function as a dealer in Freddie Mac securities (other than common stock). SS&TG's dealer functions included:
  Buying and selling for its own account or the account of others, making a market in, and standing ready to buy and sell or lend on the security of any mortgage or interest therein (including any security representing such an interest) which Freddie Mac is authorized to purchase or lend against; and any other Freddie Mac security (other than common stock); and
    Engaging in any direct, hedging, ancillary, customer accommodation, or other transaction, contract or activity which Freddie Mac is authorized to engage in, in support of the above dealer functions.

SS&TG also functioned, from time to time, as an underwriter of Freddie Mac securities (other than common stock). SS&TG's underwriting functions included:
  The acquisition of Freddie Mac PCs and other securities in cash auctions, syndicated public offerings and private placements directly or indirectly from Freddie Mac with a view to redistribution; and
  Resecuritization transactions in which SS&TG acquired mortgage-related securities or other collateral from one or more counterparties, delivers such collateral to the Corporation in exchange for securities backed by, or representing an interest in, in whole or in part, the collateral delivered to the Corporation, and retains or resells such securities, or other similar structured financing transactions, including real estate mortgage investment conduits (REMICs), combined cash flow securities (CCS), funding note securities, swap trusts (other than currency-based swaps) entered into in connection with authorized underwritten securities transactions, or similar derivative-based structured securities offerings.

SS&TG also functioned, from time to time, as a trader of mortgages or interests therein, mortgage-related or other securities, and other instruments or investments which the Corporation may purchase or sell (other than common stock). SS&TG's trading functions included the maintenance of inventories of mortgages, securities and other instruments.

SS&TG also performed, from time to time, other market-related functions and engaged in other market-related activities in support and furtherance of the above functions, such as advisory, custodial, information processing, marketing, and similar activities or services.

In these roles, SS&TG sought to convert various MBSs issued by Fannie Mae into one or more Megas. For example, the ARM (adjustable rate mortgage) trading desk of SS&TG submitted pools of Fannie Mae bonds to Fannie Mae to be grouped together into larger pools every month. These larger pools are the previously mentioned Megas. Fannie Mae charges a standard fee to form the Megas. However, Fannie Mae offers fee discounts depending on the number of Megas formed and the total amount of the Megas formed (i.e., giving a bulk discount). A group of Megas that qualify for fee bulk discounts is called a Mega-group.

For example, currently Fannie Mae charges a fee for reissuing debts in the form of Mega-groups based on the following percentages and sizes.

| | |
|---|---|
| .0234375% | $250 million |
| .03125% | $100 million |
| .046875% | $75 million |
| .0625% | $50 million |
| .078125% | $25 million |

To qualify for the bulk discount fee, Mega-groups must be formed from 3 or fewer Megas. Thus, if an investor can group together three (3) Megas into a single package that forms a Mega-group, the investor can receive a discounted package level fee for formation of that group.

However, Fannie Mae does not automatically calculate or otherwise apply a reduced fee for bulk purchasers of Megas. It is up the purchaser of the Megas to group their purchases into Mega-groups and then identify each Mega-group as qualifying for a discounted fee.

The total number of possible Mega-groups is called a Bell number, which is the number of ways a set of n elements can be partitioned into non-empty sets. An expression for a Bell number is $$B_n = \sum_{k=1}^{n} S_2(n, k)$$

where n is the total number of elements to be grouped, k is size of any particular group, and $S_2(n, k)$ is a Sterling number of the second kind, which is defined as follows $$S_2(n, k) = 1/k! \sum (-1)^i \binom{k}{i}(k-i)^n.$$

Thus, if there are 12 Megas (i.e., n=12), there are 4,213,597 possible groupings of these 12 Megas (i.e., $B_{12}$=4,213,597). However, these 4,213,597 possible groupings include groupings of all sizes, whereas for some fee structure calculations, the Megas may only be grouped in groups of m or less (e.g., m=3). Thus, the 4,213,597 sets of Mega-groups must be winnowed to exclude all Mega-groups larger than the predetermined size. Once this group is winnowed, the optimum set of Mega-groups must be selected from in such a fashion that fee is the lowest possible.

current methods for packaging Megas into Mega-groups for fee calculation purposes is an intuitive, "eyeball" best-guess of the best combination of Megas that qualifies for a discounted fee. But as recognized by the inventor, this "eyeball" approach suffers from a lack of accuracy when large numbers of Megas are being obtained. This lack of accuracy translates to lost profits due to unnecessarily higher processing fees.

Also, while there is software relating to a variety of conventional combinatorial techniques, such as the 'knapsack problem,' that may be downloaded from the internet, these conventional techniques do not produce a complete set of all groups, where a set size may not exceed a predetermined limit. Thus, as recognized by the inventor, conventional techniques and corresponding software are not applicable to the problem of packaging Megas into Mega-groups for fee calculation, where the size Mega-group is restricted.

SUMMARY OF THE INVENTION

As noted previously, for a purchaser of large quantities of Megas in a given time period, the optimum combination of grouping Megas into Mega-groups (i.e., so as to incur the minimum processing fee) is a non-trivial problem. However, successful groupings can result in a per-deal savings of $30,000 or more to a bulk trader/investor. Thus, as discovered by the inventors, it is desirable to have automated methods, tools, and computer program products configured to accurately and quickly identify a grouping of Megas that results in a reduced fee charged by the issuer of the Mega.

The present invention is directed to a method, system, and computer program product for calculating a reduced fee associated with combining previously securitized mortgage-backed securities to form a new and larger security called a Mega. The method includes identifying a group of Megas that correspond to at least one predetermined fee discount parameter. The group of Megas are members of a set of Megas and the set of Megas contain a number of Megas equal to or larger than a number of Megas in the group of Megas. The method includes calculating a fee for said group of Megas and repeating the steps of identifying a group and calculating a fee until a plurality of groups of Megas have been identified and corresponding Mega group fees have been calculated. The method also includes choosing from said plurality of groups of Megas a final set of Mega groups having a reduced total fee.

DESCRIPTION OF THE FIGURES

The features and advantages of the present invention will become more apparent from the detailed description set forth below when taken in conjunction with the drawings in which like reference numbers indicate identical or functionally similar elements.

FIG. 2 illustrates a flow chart of another embodiment of the present invention;

FIG. 3 illustrates another embodiment of the present invention; and

FIG. 4 is a block diagram of a computer associated with the present invention.

DETAILED DESCRIPTION OF INVENTION

Figure 1:
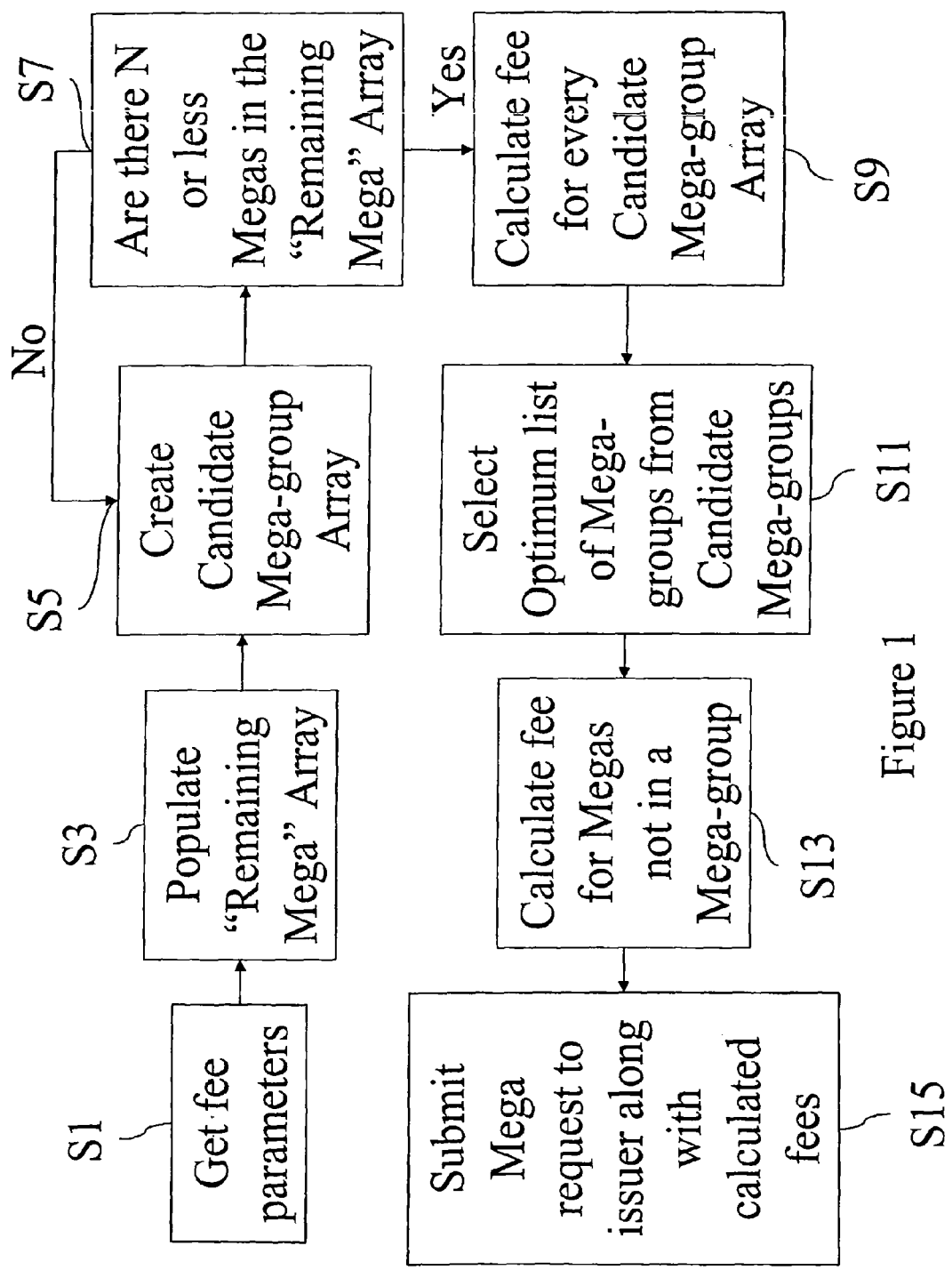
FIG. 1 illustrates a flow chart of one embodiment of the present invention.

In order to calculate the optimum fee (i.e., the smallest fee) for a collection of Megas, one may start by identifying all candidate Mega-groups for which a fee discount is available. FIG. 1 illustrates a flow chart of one embodiment of the present invention. The method begins with identifying the fee parameters associated with the Mega issuer (Step 1).

Then, an array of all Megas that may be grouped into a Mega-group is created (Step S3). This array is called a "Remaining Mega array." A candidate Mega-group is selected from the Remaining Mega array (Step S5). The candidate Mega-group will include no more than N Megas (i.e., no more than 3 Megas). The number N is one of the fee parameters identified in Step S1. This candidate Mega-group may be stored in a second array for computation ease. Alternatively, each candidate Mega-group may be flagged or otherwise annotated in the Remaining Mega array.

The method includes a step of checking whether all possible Mega-groups have been identified. If not, the method continues until all possible combinations of Megas grouped into Mega-groups have been identified. When all possible combinations of Megas have been identified, the Mega-groups which result in the lowest overall Mega re-issue fee are identified (Step S11). The identification of the Mega-groups includes calculating a fee associated with each candidate Mega-group based on the input fee structure. The fee structure is another fee parameter identified in Step S1. Alternatively, the fees may be calculated immediately after each candidate Mega-group is identified, with the final Mega-groups selected after all fees have been calculated.

Once the final Mega-groups are identified and their corresponding fees are calculated, the fees for the remaining Megas (if any) are priced individually (Step S13). Then, the request for the Megas, along with the total calculated service fee, is forwarded to the issuer of the Mesas (Step S15).

In a non-limiting example, assume the following Megas are loaded into the Remaining Mega Array:

| | | |
|---|---|---|
| $32,690,047 | $51,110,677 | $73,807,446 |
| $34,949,071 | $51,690,738 | $78,883,317 |
| $40,504,511 | $61,766,279 | $119,245,238 |
| $49,809,569 | $67,932,121 | $150,000,000 |

As noted above, the Bell number for this set of 12 results in 4,213,597 possible sets of Megas.

However, also assume no more than 3 Megas may be included in a Mega-group for the purposes of fee calculation and that the issuer will charge a fee based on the following percentages and sizes:

| Fee | Dollar Size of Mega-group |
|---|---|
| .0234375% | more than $250M |
| .03125% | between $100M and $250M |
| .046875% | between $50M and $75M |
| .0625% | between $25M and $50M |
| .078125% | less than $25 million |

To arrive at the final result, the method of this embodiment of the present invention is applied to the above-identified list of Megas to calculate the combination of Megas to present to the issuer that best takes advantage of the fee discount program so that the purchaser will be charged the lowest fee. This is accomplished via the above-described recursive process which first identifies all non-repeating combinations of three, or less, Megas that can be derived from the given set of 12 Megas. From this list of non-repeating combinations, the set of Megas with the lowest possible fee is chosen in such a way that every Mega is in one Mega-group and no Mega is in more than one Mega-group.

The calculated fees and corresponding combinations may be retained in memory for display at the completion of the program's computations. Additionally, a text file may be written containing all combinations and their fees. This file serves as a backup record of the run. Lastly, because the fee schedule is another input to the program, it may remain flexible in the event the issuer changes the fee schedule in the future.

Applying the method of FIG. 1 to the Remaining Mega array results in the following four Mega-groups:

|  | Mega-group 1 | Mega-group 2 | Mega-group 3 | Mega-group 4 |
|---|---|---|---|---|
| $1^{st}$ Mega | $150,000,000 | $32,690,047 | $49,809,569 | $119,245,238 |
| $2^{nd}$ Mega | $73,807,446 | $34,949,071 | $51,110,677 | $78,883,317 |
| $3^{rd}$ Mega | $67,932,121 | $40,504,511 | $51,690,738 | $61,766,279 |
| Mega-group total | $291,739,567 | $108,143,629 | $152,610,984 | $259,894,834 |
| Fee % | .0234375% | .03125% | .03125% | .0234375% |

In this example, the remaining Megas that are not grouped into Mega-groups will be issued with the standard, undiscounted fee of 0.078125%. In this example, the fee is calculated based on an assumption that the bulk discount applies to monthly purchases. In other embodiments, the period is other than monthly (such as, daily, weekly, quarterly, yearly, etc.). The time period is another fee parameter identified in Step S1.

In an alternative embodiment, a closed-form mathematical expression is used, where the closed-form mathematical expression corresponds to the above-described recursive identification of all possible Mega-groups, fee calculation, and Mega-group selection.

The above-described example is based on current Fannie Mae fees and practices. However, the invention applies to any fee discount program associated with mortgage-backed security trading. Thus, the method may treat the following parameters as variables: a) the fee structure; b) any restriction on the number of financial instruments that may be grouped for the purposes of fee calculation; and c) the period for which the fee calculation is determined.

In an alternative embodiment, at least one Mega that is not chosen to be a part of a Mega-group for the purpose of fee discounting is held for possible combining into a Mega-group in a future transaction.

In another alternative embodiment, the existence of at least one Mega that is not chosen to be a part of a Mega-group for the purpose of fee discounting is provided as feedback to a purchaser of mortgage-backed securities to attempt to purchase one or more additional bonds to be added to the ungrouped Mega so that this Mega may be combined with other ungrouped Megas into a new Mega-group that qualifies for a discounted fee. This process is shown in FIG. 2, where a mortgage is pooled with other mortgages (step S21), perhaps with all of these mortgages having a common characteristic (e.g., 5/1 hybrid ARMs), into a mortgage-backed security. The mortgage-backed security is purchased (step 23). The owner of the mortgage-backed security combines this instrument with other mortgage-backed securities, perhaps with all mortgage-backed securities having a common characteristic, to form a candidate Mega (step S25). This process is repeated until a group of candidate Megas exist. Then the candidate Megas are automatically grouped into candidate Mega-groups from which a final set of Mega-groups is selected according the method of FIG. 1 (step S27).

After this initial analysis, an automatic threshold detection and feedback process is employed to identify whether additional mortgage-backed securities should be purchased and added to one or more of the existing Megas to achieve a more favorable, discounted fee. In one embodiment, the feedback is applied only to the Megas that are not flagged for inclusion by the method of FIG. 1 into a final Mega-group. Thus, this embodiment is optimized to create one or more new final Mega-groups.

In an alternative embodiment, the feedback may be applied to all Megas, even those previously identified by the process of FIG. 1 as belonging to a final Mega-group. Alternatively, the feedback may be applied only to Megas that are part of a previously identified final Mega-group that has a total value within a certain range of a subsequent fee discount breakpoint. Alternatively, the feedback may be applied to final or candidate Mega-groups in their entirety.

In one or more of these threshold/feedback embodiments, the threshold analysis includes the use of one or more fee-break feedback regions. The fee-break region will have an upper and lower bound, and will include an actual fee-break point corresponding to the fee structure input as a fee parameter in Step S1 of FIG. 1. In one embodiment, the fee-break feedback regions vary in size, with an upper bound equal of the fee-break feedback region being equal to the actual fee-break value from the fee schedule, as shown in FIG. 3. The variation in size may vary in direct or inverse proportion to the dollar value of the fee-break point. Alternatively, the variation in size may vary in direct or inverse proportion to the fee discount value. In another embodiment, the fee-break feedback regions are of uniform size. The existence of a Mega or a candidate Mega-group with a total value within the fee-break feedback region will result in an automatic feedback to the purchaser of mortgage-backed securities to consider purchasing one or more additional mortgage-backed securities to add to an existing Mega so as to further improve the fee structure.

The feedback to the purchaser of mortgage-backed securities will include a purchase-by date and a minimum value required to 'bump' the Mega or Mega-group above a fee-break point. The feedback may also include restrictions on the maximum amount of mortgage-backed securities. The restriction may be a maximum dollar amount (e.g., no more than $10 million) or a maximum percentage (e.g., no more than 10%) of the existing face value of the Mega. The predetermined percentage or dollar amount may vary according to the face value of the existing Mega (e.g., low-valued Megas may be increased in size by a first percentage, while high-valued Megas may be increased in size by a second percentage different from the first percentage.) Other factors may be included in the feedback, such as a desired purchase date or a security characteristic.

In another embodiment, the method described in FIG. 1 is modified so that a non-exhaustive analysis is performed, thus reducing computation time and cost. The non-exhaustive analysis is designed to automatically identify a best guess of the optimum (i.e., lowest) fee structure, where the best guess will be close to, but may not be identical to, the actual optimum fee. This non-exhaustive analysis may include intelligently truncating or otherwise abbreviating the recursive method of FIG. 1. Truncation may result in an analysis where only a predetermined number of the largest Megas (such as, the top 5) or a predetermined percentage of the Megas (such as, the 50% of all Megas that are the largest Megas) are exhaustively paired with all other Megas. Alternatively, the non-exhaustive search may include a presumption that certain Megas will be combined; for example, the largest two Megas will be combined, the largest and the smallest Mega will be combined, or another predetermined combination will be assumed. Other truncation methods may be employed as well. The truncation may be an automatic option initiated in response to predetermined criteria such as individual Mega dollar amount, total Mega dollar amount, distribution of Mega dollar amount, relative size differences between two or more Megas, or other criteria known to one skilled in the art of computation.

FIG. 4 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A computer implemented method of calculating a reduced fee associated with combining previously securitized mortgage-backed securities to form a Mega, which is a new and larger security backed by two or more of said previously securitized mortgage-backed securities, comprising:
   identifying, with a first computer, a group of Megas that correspond to at least one predetermined fee discount parameter, said group of Megas being members of a set of Megas, said set of Megas containing a number of Megas equal to or larger than a number of Megas in said group of Megas, setting a maximum number of Megas m;
   calculating, with a second computer, a fee for said group of Megas;
   repeating said steps of identifying a group and calculating a fee until a plurality of groups of Megas have been identified and corresponding Mega group fees have been calculated;
   choosing, with a third computer, from said plurality of groups of Megas a final set of Mega groups having a reduced total fee; and
   combining the final set of Mega groups to form a new mortgage backed security having a reduced prepayment variation in comparison to the groups of Megas such that the maximum number of Megas in the new mortgage backed security is not greater than m.

2. The method of claim 1, wherein said plurality of groups of Megas comprises:
   all possible groups of Megas that comply with said at least one predetermined fee discount parameter.

3. The method of claim 1, wherein said reduced total fee for all Megas comprises:
   the lowest possible fee for all Megas.

4. The method of claim 1, wherein said plurality of groups of Mega comprises:
   all possible groups of Megas that comply with said at least one predetermined fee discount parameter and with a predetermined calculation truncation parameter.

5. The method of claim 1, wherein said at least one predetermined fee discount parameter comprises at least one of:
   a fee discount schedule;
   and
   an issue request time-period restriction.

6. The method of claim 1, further comprising:
   providing feedback regarding an additional purchase of a mortgage-backed security to be added to one of said set of Megas.

7. The method of claim 6, wherein said one of said set of Megas comprises:
   a Mega not included in said final set of Mega groups.

8. The method of claim 7, further comprising:
   identifying another group of Megas that correspond to said at least one predetermined fee discount parameter, said another group of Megas being members of another set of Megas, said another set of Megas including one or more Megas not included in said final set of Mega groups, said one or more Megas not included in said final set of Mega groups having been increased in dollar value as a result of said step of providing feedback;
calculating a fee for said another group of Megas;
repeating said steps of identifying another group and calculating a fee until another plurality of groups of Megas have been identified and corresponding another Mega group fees have been calculated; and
choosing from said another plurality of groups of Megas another final set of Mega groups having another reduced total fee.

9. The method of claim 6, wherein said step of providing feedback comprises:
determining whether one of said set of Megas has a total dollar value within a predetermined range of a break point within said fee discount schedule.

10. A system for calculating a reduced fee associated with combining previously securitized mortgage-backed securities to form a Mega, which is a new and larger security backed by two or more of said previously securitized mortgage-backed securities, comprising:
means for identifying a group of Megas that correspond to at least one predetermined fee discount parameter, said group of Megas being members of a set of Megas, said set of Megas containing a number of Megas equal to or larger than a number of Megas in said group of Megas;
means for setting a maximum number of Megas m;
means for calculating a fee for said group of Megas;
means for repeatedly identifying a group and calculating a fee until a plurality of groups of Megas have been identified and corresponding Mega group fees have been calculated;
means for choosing from said plurality of groups of Megas a final set of Mega groups having a reduced total fee; and
means for combining the final set of Mega groups to form a new mortgage backed security having a reduced prepayment variation in comparison to the groups of Megas such that the maximum number of Megas in the new mortgage backed security is not greater than m.

11. The system of claim 10, wherein said plurality of groups of Mega comprises:
all possible groups of Megas that comply with said at least one predetermined fee discount parameter.

12. The system of claim 10, wherein said reduced total fee for all Megas comprises:
the lowest possible fee for all Megas.

13. The system of claim 10, wherein said plurality of groups of Mega comprises:
all possible groups of Megas that comply with said at least one predetermined fee discount parameter and with a predetermined calculation truncation parameter.

14. The system of claim 10, wherein said at least one predetermined fee discount parameter comprises at least one of:
a fee discount schedule; and
an issue request time-period restriction.

15. The system of claim 10, further comprising:
means for providing feedback regarding an additional purchase of a mortgage-backed security to be added to one of said set of Megas.

16. The system of claim 15, wherein said one of said set of Megas comprises:
a Mega not included in said final set of Mega groups.

17. The system of claim 15, further comprising:
means for identifying another group of Megas that correspond to said at least one predetermined fee discount parameter, said another group of Megas being members of another set of Megas, said another set of Megas including one or more Megas not included in said final set of Mega groups, said one or more Megas not included in said final set of Mega groups having been increased in dollar value in response to said means for providing feedback;
means for calculating a fee for said another group of Megas;
means for repeatedly identifying another group and calculating a fee until another plurality of groups of Megas have been identified and corresponding another Mega group fees have been calculated; and
means for choosing from said another plurality of groups of Megas another final set of Mega groups having another reduced total fee.

18. The system of claim 15, wherein said means for providing feedback comprises:
means for determining whether one of said set of Megas has a total dollar value within a predetermined range of a break point within said a fee discount schedule.

19. A computer program product including instructions for calculating a reduced fee associated with combining previously securitized mortgage-backed securities to form a Mega, which is a new and larger security backed by two or more of said previously securitized mortgage-backed securities, said computer program product comprising instructions for:
identifying a group of Megas that correspond to at least one predetermined fee discount parameter, said group of Megas being members of a set of Megas, said set of Megas containing a number of Megas equal to or larger than a number of Megas in said group of Megas;
setting a maximum number of Megas m;
calculating a fee for said group of Megas;
repeating said steps of identifying a group and calculating a fee until a plurality of groups of Megas have been identified and corresponding Mega group fees have been calculated;
choosing from said plurality of groups of Megas a final set of Mega groups having a reduced total fee; and
combining the final set of Mega groups to form a new mortgage backed security having a reduced prepayment variation in comparison to the groups of Megas such that the maximum number of Megas in the new mortgage backed security is not greater than m.

20. The method of claim 1, further comprising:
selling the new mortgage-backed security to a purchaser.

21. The method of claim 20, wherein the purchaser defines said predetermined fee discount parameter.

22. The system of claim 10, further comprising:
means for selling the new mortgage-backed security to a purchaser.

23. The computer program product of claim 19, further comprising instructions for selling the new mortgage-backed security to a purchaser.

24. The method of claim 1, wherein each of the Megas of the group of Megas contains at least one mortgage-backed security and the new mortgage-backed security formed by combining the Megas of the final set of Megas includes all of the mortgage-backed securities of the Megas of the final set of Megas.

25. The method of claim 1, wherein the predetermined fee discount parameter is a fee set by a purchaser of the new mortgage-backed security.

* * * * *